United States Patent Office 2,829,118
Patented Apr. 1, 1958

2,829,118

PROCESS FOR FORMING SHAPED BODIES FROM POLYETHYLENE

Wilhelm Wehr, Hanau (Main), Germany, assignor to Deutsche Gold- und Silber-Scheideanstalt vormals Roessler, Frankfurt am Main, Germany No Drawing. Application September 23, 1953
Serial No. 382,004

Claims priority, application Germany September 30, 1952

7 Claims. (Cl. 260—34.2)

The present invention relates to an improved process for the production of shaped bodies such as filaments, foils, plates, rods, tubes, coatings and the like from polyethylene.

Previously, the working up of polyethylene in the form of its solutions in organic solvents has not been successful. The reason for this primarily is that only a few solvents seem to be suitable for this purpose and that polyethylene will dissolve therein only at elevated temperatures. Furthermore, the effect of this is that upon cooling the solutions formed at elevated temperatures they undergo gelling and the solvent more or less separates out. Consequently films which have been poured must be dried above the melting point of the polyethylene as otherwise only cracked and crumbly films are obtained.

It is an object of the present invention to provide a process for the production of shaped bodies from polyethylene with the aid of organic solvents which avoids the aforementioned drawbacks.

In accordance with the invention, it was unexpectedly discovered that polyethylene could be worked up into semi finished or finished products in a very advantageous manner by first swelling polyethylene at normal or only slightly elevated temperatures but nevertheless below the temperature at which polyethylene dissolves in a suitable solvent or solvent mixture, and after removing the excess solvent not taken up by the resulting swollen polyethylene melting the swollen polyethylene at an elevated temperature either under normal or elevated pressures. Depending upon the type and quantity of the solvent taken up by the polyethylene the swollen polyethylene softens or melts at a temperature more or less below the softening point of the polyethylene employed. The shaping of the swollen and softened polyethylene can take place in the usual manner, for example, by extrusion or compression molding under pressure or also otherwise shaping without application of pressure. The deformation of the swollen polyethylene can be carried out at temperatures below the normal softening point of polyethylene which normally is about 110° C. and subsequent heating to a higher temperature during drying of the shaped swollen product is not necessary according to the invention.

In accordance with the prior processes in which solutions of polyethylene were employed, it was, to the contrary, necessary to effect drying at temperatures above the softening point as otherwise only cracked and crumbly products were obtained. Consequently it was unexpected that the swollen products could be dried in accordance with the invention at only slightly raised temperature or even room temperature without deleteriously affecting the cohesion of the product.

The low temperatures at which the process according to the invention can be carried out are of special advantage as at temperatures above 120° C. the sensitivity to oxygen of polyethylene becomes noticeable so that any heating over such temperature in the presence of oxygen must be of as short a duration as possible. For example, in order to apply a coating of polyethylene of a molecular weight of 13,000 upon paper or textiles with a spreading knife, it is necessary to employ temperatures of about 200° C. For polyethylene with a molecular weight of 16,000 it is necessary to employ a temperature of about 300° C. When polyethylene is extruded it is necessary to employ temperatures between about 140° C. and 200° C. In accordance with the present invention shaping of the fused swollen mass preferably takes place at a temperature between 60 and 100° C.

The solvents or swelling agents employed according to the invention increase the softness of the polyethylene and thereby improves its cutting characteristics to a substantial degree. Nevertheless the product has sufficient strength that it is easily cut under usual conditions in industry. It is possible therefore to cut up blocks formed by fusing the swollen polyethylene in the apparatus customarily employed in the celluloid industry to form foils, slabs, rods and the like of desired dimension. Polyethylene itself can also be fused to a block, but because of its hardness, it is difficult to cut up in the manner described.

The following solvents which have a swelling effect upon polyethylene at normal or only slightly raised temperatures are, for example, suited for carrying out the process according to the invention: aromatic, aliphatic, hydroaromatic and chlorinated hydrocarbons such as benzine, benzol, toluol, xylol, cyclohexane, tetralin, hexalin, decalin, carbon tetrachloride, tri and perchloroethylene chloro benzol, mono styrene and the like. In some instances such solvents can be cut with non-solvents for polyethylene. Furthermore, in order to soften the finished products it is also possible to dissolve or disperse polyisobutylene natural or synthetic rubber, gutta percha and the like in the solvents employed to swell the polyethylene so that they are incorporated in the polyethylene. Soluble dyes, for example, gudan dyes, can also be added to the solvents to color the polyethylene products in any desired manner.

The temperatures employed for the swelling treatment according to the invention depend upon the molecular weight of the polyethylene, the solvent employed as well as the desired lowering of the temperature to be employed for shaping. In many instances temperatures as low as 20° C. suffice, for example, with perchloro ethylene temperatures of about 20° C. suffice for the swelling and with benzine an elevated temperature, but below the temperature at which the polyethylene dissolves, i. e. 60–70° C. is employed. One or two days usually suffice for swelling the usual commercial small sized polyethylene. The swelling in each instance is effected at a temperature below that at which the polyethylene dissolves in the solvent and preferably is below 50° C. During or after the deformation the swollen polyethylene should not contain more than 100% of solvent as otherwise the products have a tendency to crack on drying. Generally a swelling degree of 10% to 100% can be employed and preferably swelling degrees of 30% to 80% are employed. The degree of swelling is the percentage increase in weight of the starting material caused by the solvent taken up.

Pigments or fillers can be incorporated in the swollen polyethylene in a kneading machine for example, a worm press or on rollers. Expediently higher swelling degrees are employed in order to lower the viscosity of the fused mass during kneading and facilitate homogenizing the mass. The addition of solutions or pastes of polymers compatible with polyethylene is easily accomplished thereby. If the degree of swelling exceeds that desirable for subsequent deformation or further treatment the excess solvent can be removed for example by drawing it off in a vacuum kneading machine.

The process according to the invention increases the working range of polyethylene. The semi-finished products produced can be further worked up either in dried or undried form.

The melts produced from the swollen polyethylene according to the invention are very advantageous for coating or laminating paper, textiles, fiber fleeces, metal foils and the like by the spreading or rolling lacquering procedure. For this purpose, it is expedient to employ a high degree of swelling so that sufficiently thin liquid melts are obtained upon heating capable of application upon bases by usual methods. In view of the considerably lower working temperatures required by the process according to the invention it is not necessary as when employing polyethylene per se to take measures to prevent attack by oxygen contained in the air. Coatings of 7–50 grams per square meter are easily obtained according to the present invention.

The ease of charging and handling the swollen polyethylene provides substantial advantages in fabrication. The swollen material can, for example, be charged in the same manner as unswollen polyethylene into worm presses and produces homogeneous melts very quickly.

The following examples will serve to illustrate several modifications of the process according to the invention.

*Example 1*

100 kg. of polyethylene of a molecular weight of 19,000 were covered with xylol and permitted to stand for 1 day at about 20° C. Thereupon the excess liquid was passed off and the weakly swollen polyethylene particles, which had increased in weight by 30 kg. were charged into a round compression mold and fused into a solid cylinder at a temperature of 90° C. under a pressure of 0.5 kg./cm.$^2$. After cooling the cylinder was cut on a lathe to produce a foil therefrom and the resulting foil was dried at 40° C. The mechanical properties of the foil could be substantially improved by stretching the foil.

*Example 2*

100 kg. of polyethylene of a molecular weight of 19,000 were swollen for 2 days at 20° C. in perchloroethylene. The resulting swollen polyethylene which weighed 180 kg. was introduced into a kneading machine in which a paste of 20 kg. of polyisobutylene of a molecular weight of 200,000 in 80 kg. of perchloroethylene was introduced previously. Upon heating to 80° C. a homogeneous viscous paste was obtained into which 10 kg. of titanium white were kneaded. Thereafter 80 kg. of the solvent were drawn off and the mass introduced into a heated press and compressed as in Example 1 to a solid block. After cooling the block was planed to produce plates of desired thickness and these plates were then dried at a temperature below the softening point of the polyethylene. To improve the surface qualities of the plates they were pressed in a shelved press between sheet metal having the desired surface characteristics, that is, polished, matte or grained.

*Example 3*

10 kg. of polyethylene of a molecular weight of 15,000 were swollen for 2 days at 20° C. in perchloroethylene whereby a weight increase of 10 kg. took place. A longer swelling period produced no further increase of weight. The swollen material was continuously fed to a heated warm press having a slit nozzle in which it was heated by the time it reached the nozzle to 80–100° C. The extruded fused material flowed upon a moving band of paper and was spread to the desired thickness with a knife. Directly after the spreading knife the coated paper was passed through a drier in which the swollen material is dried before it cools to a temperature at which the polyethylene cannot take up all the solvent present and then after calendering was rolled up.

*Example 4*

100 kg. of particulate polyethylene of a molecular weight of 18,000 were covered with perchloroethylene and permitted to stand for 2 days at 20° C. The weakly swollen particles which had increased in weight by 60 kg. were then introduced into a heated compression mold and heated to 80° C. under pressure of 5 kg./cm.$^2$ whereby the individual particles fused to a solid block. After the block was cooled rods were planed off and were dried at about 40° C.

*Example 5*

100 kg. of polyethylene of a molecular weight of 19,000 were swollen for 1 day at 30° C. in solvent naphtha whereby a weight increase of 50 kg. took place. The swollen material was continuously fed to a heated worm press having a slit nozzle in which it was heated by the time it reached the nozzle to 100–140° C. The extruded fused material flowed upon a moving band of paper and was spread to the desired thickness with a knife. Directly after the spreading knife the coated paper was passed through a drier and then after calendering was rolled up.

The process according to the invention also renders it possible to produce various pattern effects in polyethylene as it is customary in the Celluloid industry by using slabs or platelets of differently colored swollen polyethylenes and fusing them into a solid block which block can then be cut or planed to produce the desired shapes.

I claim:

1. A process for producing shaped bodies of polyethylene which comprises swelling polyethylene in a solvent which only dissolves polyethylene at an elevated temperature, said swelling being carried out at a temperature below that at which the solvent dissolves the polyethylene, separating the swollen polyethylene from any excess solvent and then fusing and shaping the fused swollen polyethylene at an elevated temperature.

2. A process according to claim 1 in which said swelling takes place at a temperature below 50° C.

3. A process according to claim 1 in which said swelling is continued until the polyethylene has taken up 10% to 100% of its weight in solvent.

4. A process according to claim 1 in which said swelling is continued until the polyethylene has taken up 30% to 80% of its weight in solvent.

5. A process according to claim 1 in which the shaping of the swollen polyethylene takes place at a temperature between 60° and 100° C.

6. A process according to claim 1 in which a portion of the solvent is removed from the fused swollen polyethylene before it is shaped.

7. A process for producing shaped bodies of polyethylene which comprises swelling polyethylene in a solvent which only dissolves polyethylene at an elevated temperature, said swelling being carried out at a temperature below that at which the solvent dissolves the polyethylene, separating the swollen polyethylene from any excess solvent and then fusing and shaping the fused swollen polyethylene at an elevated temperature which is below the softening point of the polyethylene per se.

References Cited in the file of this patent

UNITED STATES PATENTS 2,753,287 Thompson _____ July 3, 1956

FOREIGN PATENTS 613,018 Great Britain _____ Nov. 22, 1948